(12) United States Patent
Nakamura

(10) Patent No.: US 6,468,162 B1
(45) Date of Patent: Oct. 22, 2002

(54) GAME MACHINE AND INFORMATION STORAGE MEDIUM

(75) Inventor: Takashi Nakamura, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/447,826

(22) Filed: Nov. 23, 1999

(30) Foreign Application Priority Data

Nov. 26, 1998 (JP) ............................................ 10-352121

(51) Int. Cl.$^7$ ................................................. A63F 13/10
(52) U.S. Cl. ............................ 463/43; 463/29; 463/23; 463/43
(58) Field of Search ............................... 463/23–24, 29, 463/43, 44, 1; 705/26

(56) References Cited

U.S. PATENT DOCUMENTS

| | | | |
|---|---|---|---|
| 5,858,930 A | | 8/1989 | Sato |
| 5,083,271 A | * | 1/1992 | Thacher et al. ............... 700/91 |
| 5,720,663 A | | 2/1998 | Nakatani et al. |
| 5,983,200 A | * | 11/1999 | Sltoznick ..................... 705/26 |
| 6,018,720 A | * | 1/2000 | Fujimoto ..................... 705/26 |
| 6,061,656 A | * | 5/2000 | Pace ............................. 705/1 |
| 6,200,216 B1 | * | 3/2001 | Peppel ........................... 463/1 |
| 2001/0003714 A1 | * | 6/2001 | Takata et al. ................. 463/40 |

* cited by examiner

*Primary Examiner*—Jessica Harrison
(74) *Attorney, Agent, or Firm*—Oliff & Berridge, PLC

(57) ABSTRACT

A game machine and information storage medium is provided which realizes the collection of character information and smooth play of a network game by utilizing a portable device that stores information. When the portable device is inserted into a game machine, character information is randomly selected and written into the portable device, or character information in the portable device is printed. Furthermore, character information not still stored in the portable device may be written into the same. Based on a combination of stored character information or personal information of a player, the character information is selected. A player can play an accessory game during the writing/printing time. The character information written or printed may vary depending on the result of the game. An arcade game machine may connect to a network and information can be transferred between the arcade game machine and a domestic game machine utilizing the portable device.

32 Claims, 13 Drawing Sheets

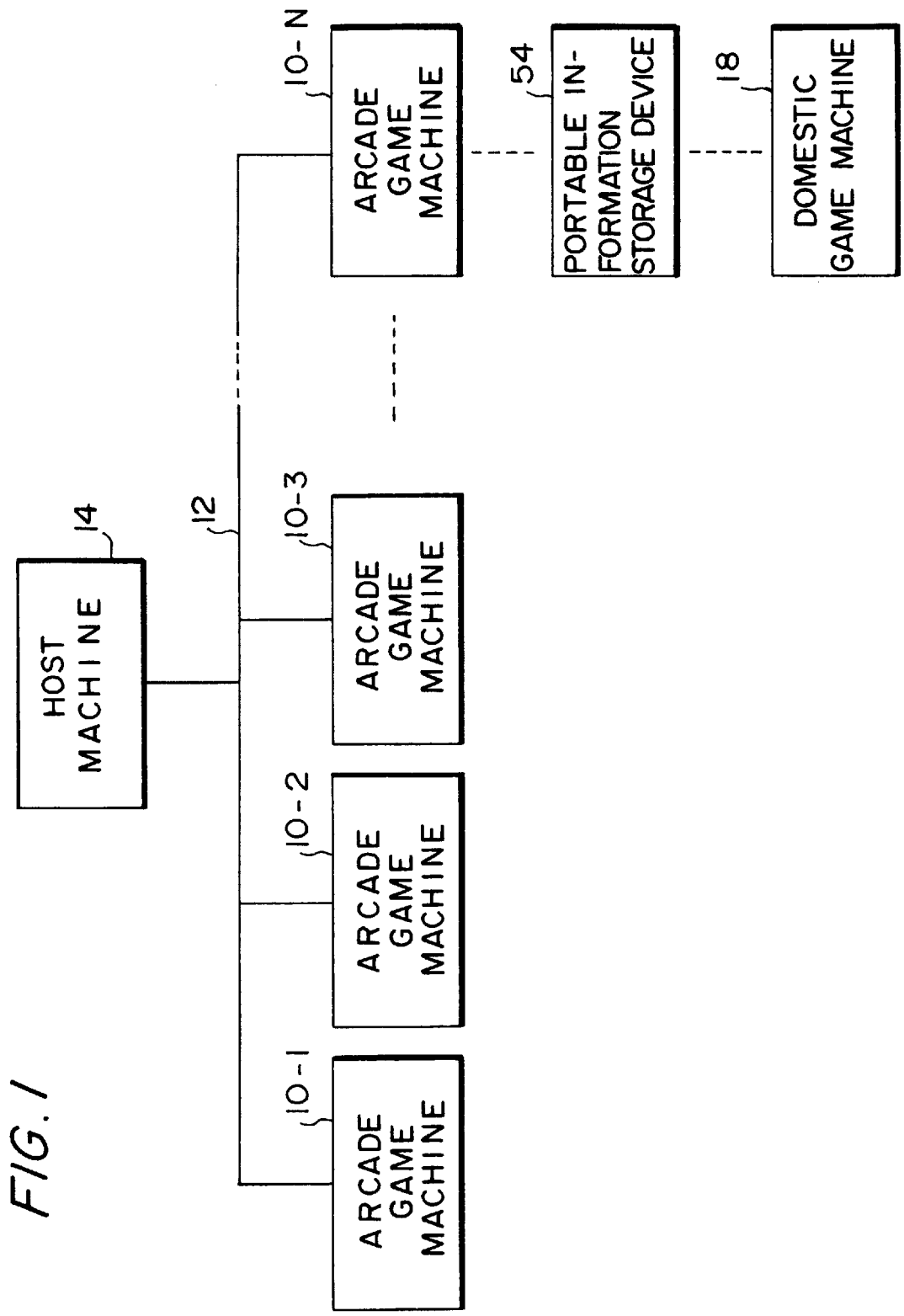

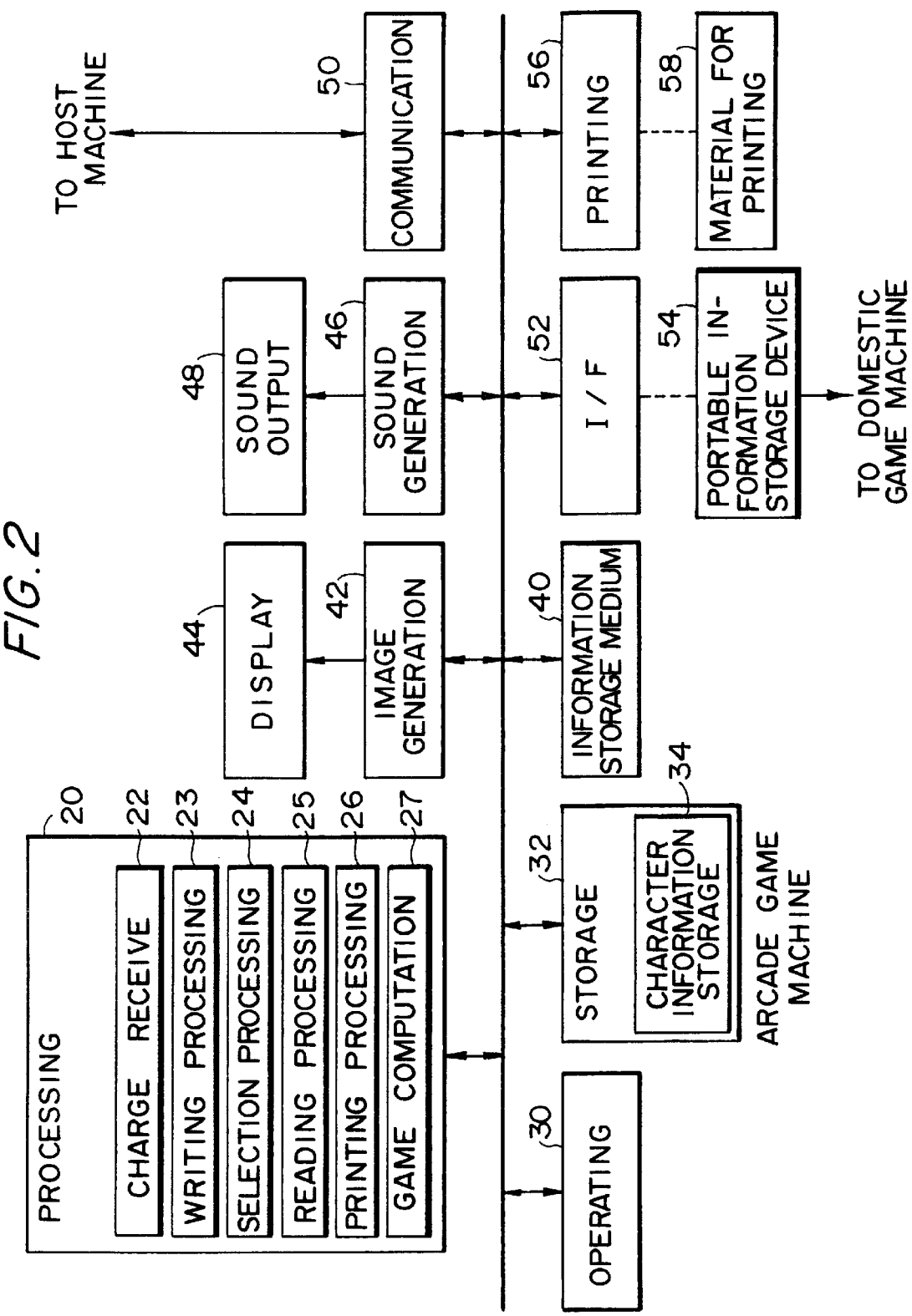

VARIABLE DEPENDING
ON GAME RESULT

| FIG. 9A |
|---|
| FIG. 9B |

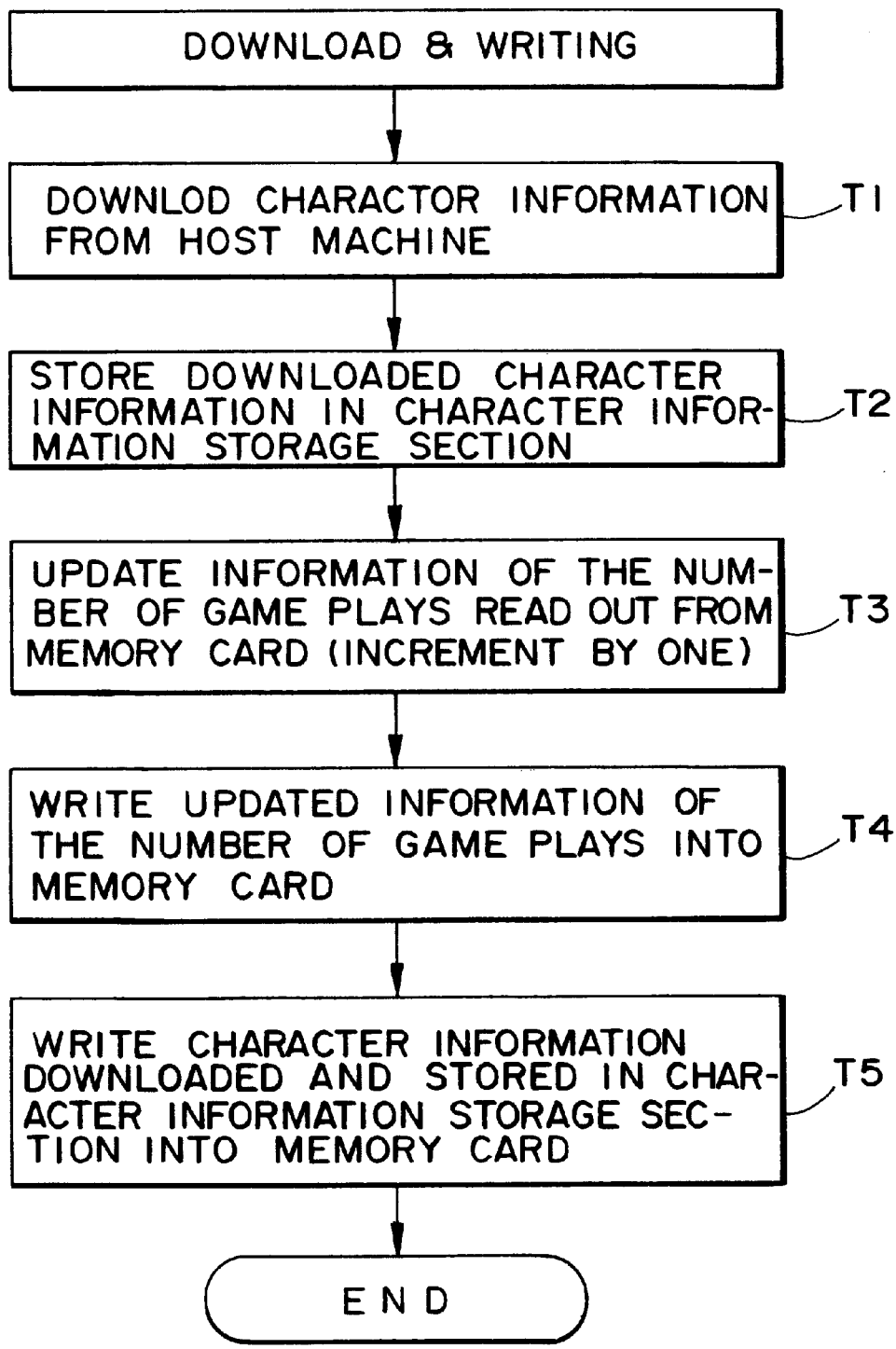

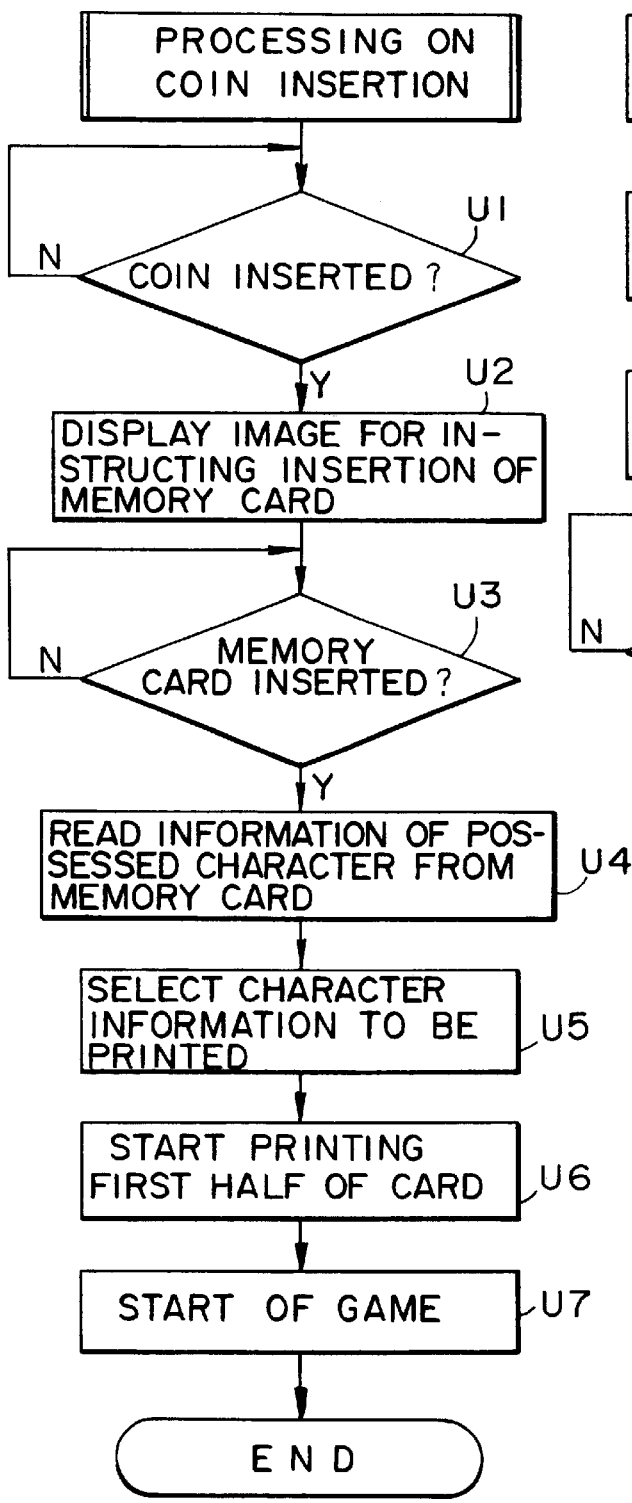
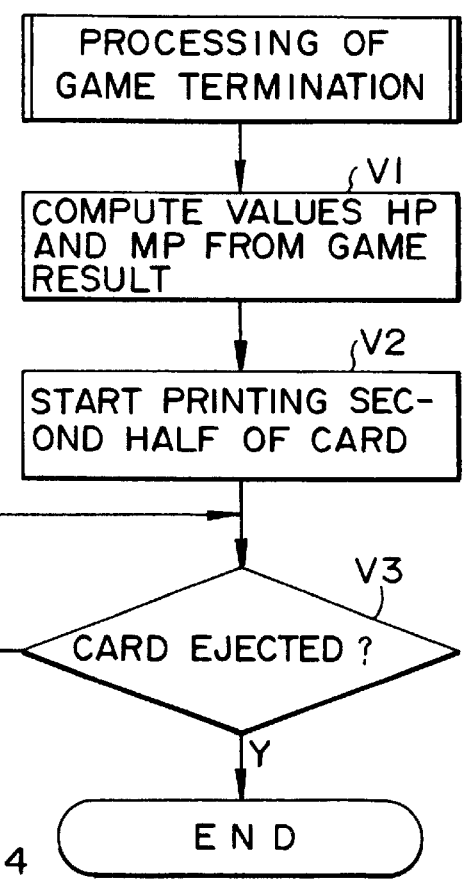
FIG.11A
FIG.11B

GAME MACHINE AND INFORMATION STORAGE MEDIUM

BACKGROUND OF THE INVENTION

1. Field of the Invention

The present invention relates to a game machine and an information storage medium.

2. Description of the Related Art

Recently, there are trading cards each including the picture of a monster and/or the data of monster's ability printed thereon (which will be referred to "monster cards") Such monster cards are caught on, particularly, with low aged people since they can together enjoy a monster-fighting game using such cards at any place.

The monster cards are generally sold as a set. Children will always purchase such sets of monster cards to collect new monster cards which have not been possessed by them. However, card makers do not have means for knowing which types of monster cards are possessed by the children. Thus, monster cards are selected at random and packaged into a set. Children cannot know the types of monster cards until a package is opened after purchased. This raised a problem in that all the types of monster cards can only be collected with much time and money.

On the other hand, amusement centers including many arcade game machines have a problem of what to do to attract people to the game machines. In recent years, however, domestic game machines are highly improved in performance. Particularly, with respect to the generation of images, the domestic and arcade game machines have been equal to each other in performance. Therefore, it increasingly becomes difficult to draw people to the amusement centers only by the high performance in the arcade game machines. It is thus desired for the arcade game machines to have any selling point other than the high performance for drawing people to the amusement centers.

Furthermore, an attempt has been made to popularize games by connecting domestic game machines to one another through a network such as Internet. However, the connection of the domestic game machine to the network requires an initial investment together with increased communication cost. This is an obstruction against the popularization of games through the network. It is therefore the present state that the network games are not popularized as anticipated.

SUMMARY OF THE INVENTION

In view of the aforementioned problems, it is an objective of the present invention to provide a game machine and information storage medium which can realize collection of character information by utilizing a portable information storage device.

Another objective of the present invention is to provide a game machine and information storage medium which can attract many players to an amusement center in which arcade game machines are placed.

Still another objective of the present invention is to provide a game machine and information storage medium which can realize a smooth game play in a network game.

According to a first aspect of the present invention, there is provided a game machine for selling character information in order to achieve these objectives. This game machine comprises: means for receiving a charge; and means for performing processing for writing the character information into a portable information storage device when the charge has been paid, wherein the writing means performs processing for writing at least one item of the character information selected from a plurality of items of the character information at random or at random under a given condition into the portable information storage device.

When the charge is paid by the player, the character information selected at random or at random under a given condition is written into the portable information storage device. Thus, the present invention can provide the player with an enjoyment of purchasing and collecting character information, which would never be provided by the prior art game machines. Particularly, the present invention causes the character information selected at random (or at random under a given condition) to be written into the portable information storage device. This can enhance the player's hope of getting character information which the player has still not possessed. Thus, the present invention can provide an enjoyment of game which would never been provided by the machine according to the prior art for simply selling data by selection by the player.

The character information to be written into the portable information storage device may be selected based on information already stored in the portable information storage device. This makes it possible to write the character information corresponding to the information already stored in the portable information storage device into the portable information storage device. As a result, there can be provided an enjoyment of game which would not be obtained from so-called monster cards or the like.

The character information still not stored in the portable information storage device may be selected to be written into the portable information storage device. This can overcome such a matter that character information not wanted by the player increases. Alternatively, the character information already possessed by the player may be written into the portable information storage device with a given probability.

The character information may be selected based on combination of character information already stored in the portable information storage device. This can provide variety and unexpectedness of the character information written into the portable information storage device.

The character information may be selected based on personal information of a player. This makes it possible to write the character information corresponding to the personal information of the player into the portable information storage device, providing the portable information storage device with individuality.

The personal information may be information of the number of game plays by the player. By treating well a player who has played the game a lot of times, players tend to continue the game.

According to a second aspect of the present invention, there is provided a game machine for printing character information, comprising: means for receiving a charge; means for performing processing for reading out the character information stored in a portable information storage device when the charge has been paid; and means for performing processing for printing the read character information on a material for printing.

When the charge is paid by the player, the character information in the portable information storage device is printed on a material for printing. This makes it possible to enjoy the game using a printed material onto which the character information has been printed. By visually printing electronic information, the player's desire to possess can be satisfied.

The game machine of the present invention may further comprise means for performing a game computation for enabling a player to play a given game during the time when the character information is being written into the portable information storage device or during the time when the character information is being printed on a material for printing. This makes it possible to reduce the waiting time sensed by the player and to realize a smooth game play.

The character information to be written into the portable information storage device or to be printed on a material for printing may be changed depending on the result of the game by the player. This makes it possible to give individuality to the character information to be written into the portable information storage device or to be printed on a material for printing. This can increase the degree of player's enthusiasm for the game.

The game machine may be connected to a network, the portable information storage device may be mounted into a domestic game machine, and information may also be transferred between the portable information storage device and the domestic game machine. By utilizing this portable information storage device, information can be transferred between the network and a domestic game machine. Therefore, the player can substantially enjoy a network game without connection of its domestic game machine to the network.

According to a third aspect of the present invention, there is provided an arcade game machine placed in an amusement center, comprising: communication means for communicating information through a network; means for performing processing for writing information sent through the network into a portable information storage device, wherein the portable information storage device can be mounted into a domestic game machine and information can also be transferred between the portable information storage device and the domestic game machine; and means for performing a game computation for enabling a player to play a given game during the time when information received through the network is being written into the portable information storage device.

This aspect of the present invention makes it possible to read information from the network into a domestic game machine through an arcade game machine and portable information storage device, and to enjoy a game using the information from the network. Moreover, the player can play a given game during time when the information is being written into the portable information storage device. Therefore, the waiting time sensed by the player can be reduced to provide a smooth game play.

According to a fourth aspect of the present invention, there is provided an arcade game machine placed in an amusement center, comprising: communication means for communicating information through a network; means for performing processing for writing information sent through the network into a portable information storage device, wherein the information storage device can be mounted into a domestic game machine and information can also be transferred between the portable information storage device and the domestic game machine; and means for selecting information to be written into the portable information storage device based on information already stored in the portable information storage device.

This aspect of the present invention makes it possible to enjoy a game using the information from the network without connection of a domestic game machine to the network. Moreover, the information to be written into the portable information storage device is selected according to the other information already stored in the portable information storage device. Thus, any information still not stored in the portable information storage device may be written thereinto. Alternatively, the information to be written may be selected according to combination of information already stored in the portable information storage device or the personal information of the player.

BRIEF DESCRIPTION OF THE DRAWINGS

FIG. 1 illustrates an example of a game system which includes game machines constructed in accordance with one embodiment of the present invention.

FIG. 2 illustrates an example of a game machine constructed in accordance with the embodiment of the present invention.

FIG. 10 is a flowchart illustrating another example of a detailed process in this embodiment.

FIGS. 11A and 11B are flowcharts illustrating still another example of a detailed process in this embodiment.

DETAILED DESCRIPTION OF THE PREFERRED EMBODIMENT

Figure 3A:
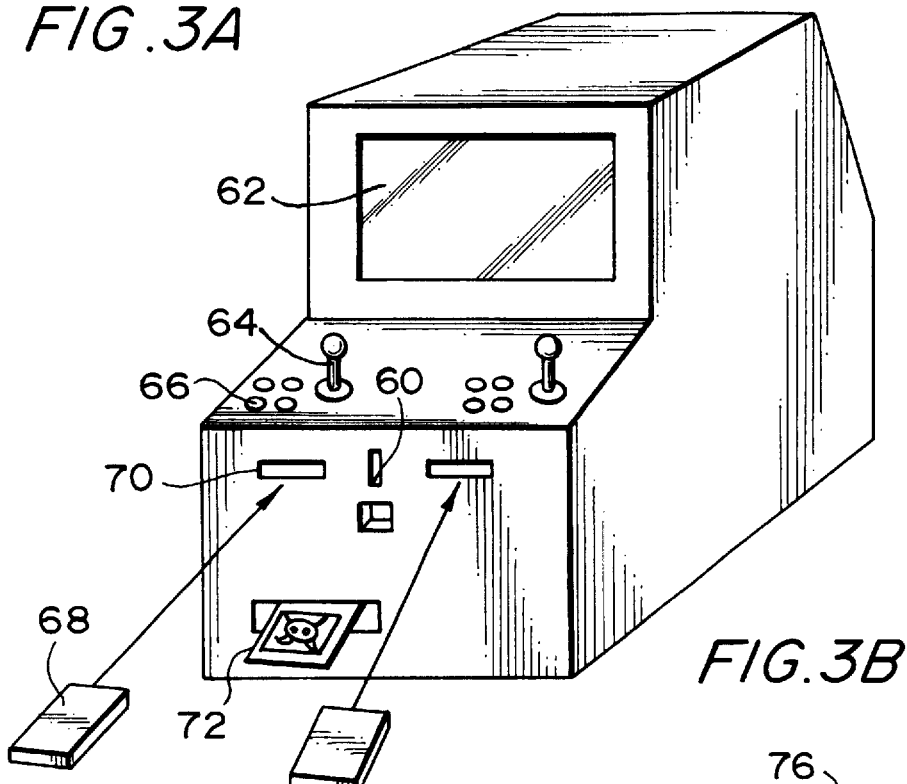
FIG. 3A illustrates an example of the game machine constructed in accordance with the embodiment of the present invention.

Preferred embodiment of the present invention will now be described with reference to the drawings.

1. Entire Arrangement of Game System FIG. 1 shows an example of the entire arrangement of a game system which includes game machines constructed in accordance with one embodiment of the present invention. Arcade game machines 10-1 to 10-N are placed in an amusement center and connected to a host machine 14 through a network 12. The connection may be of any of various types such as direct connection using I/O ports, connection through a small-scale network such as a local area network (LAN), connection through a global network such as an internet and other connections. The network structure may be of any of various types such as bus type, ring type, tree type, star type or other types. For example, a connection according to the standard of IEEE1394 or USB is desirably associated with a tree-type network. A server may be located between the arcade game machines and the host machine to provide a decentralized process. One of the connected arcade game machines may function as a host machine. In addition, the connection to the network may be performed through telephone lines if required or at all times.

A portable information storage device (e.g., a memory card or personal digital assistant (PDA)) 54 can be mounted into an arcade game machine 10 (one of the arcade game machines 10-1 to 10-N) and a domestic game machine 18. Therefore, information can be transferred (or exchanged) between the portable information storage device 54 and the arcade game machine 10, and also between the portable information storage device and the domestic game machine 18. Therefore, any information obtained by the domestic game machine 18 during a game play or the like can be transmitted to the arcade game machine 10 through the portable information storage device 54. Any information obtained from the arcade game machine 10 during a game play or the like can be transmitted to the domestic game machine 18 through the portable information storage device 54.

The transfer of information between the portable information storage device 54 and the arcade game machine 10 may be realized by providing the portable information storage device 54 in a slot or the like of the arcade game machine 10, or by using a radio-wave or infra-red wireless communication. The transfer of information between the portable information storage device 54 and the domestic game machine 18 may be realized in the same manner.

As described, the connection of the domestic game machine to the network requires an initial investment with increased communication cost. On the other hand, the arcade game machines are commercially beneficial due to payment of coins (charges). If the connection of the arcade game machines to the network increases the proceeds, it is easier to introduce the network in comparison with the domestic game machine.

In view of this point, this embodiment connects the arcade game machine 10 rather than the domestic game machine 18 to the network, as shown in FIG. 1. The transfer of information between the network and the domestic game machine 18 is realized by the use of the portable information storage device 54 which can perform the transfer of information not only between the portable information storage device and the arcade game machine 10 but also between the portable information storage device and the domestic game machine 18. Thus, without connection of the domestic game machine 18 to the network, the player can substantially enjoy the network game. In other words, the player can transfer information from the host machine 14 to the domestic game machine 18 through the corresponding arcade game machine 10 and the portable information storage device 54. The player can further send information from the domestic game machine 18 to the host machine 14 through the portable information storage device 54 and the corresponding arcade game machine 10.

2. Arrangement of Arcade Game Machine

FIG. 2 shows an example of the arrangement of an arcade game machine which comprises a processing section 20, an operating section 30, a storage section 32, an information storage medium 40, an image generation section 42, a display section 44, a sound generation section 46, an sound output section 48, a communication section 50, an interface (I/F) section 52 and a printer 56 for printing on a material for printing 58.

In such an arrangement, the processing section 20 performs processing such as control of the entire game machine, instruction to each block in the game machine, computation of the game and so on. The functions of the processing section 20 can be realized by any suitable hardware such as CPU (CISC type or RISC type), DSP, or ASIC (gate arrays or the like), or by a given program (game program). The processing section 20 comprises a charge receive section 22, a writing processing section 23, a selection processing section 24, a reading processing section 25, a printing processing section 26 and a game computation section 27.

The charge receive section 22 performs processing for receiving a charge such as a coin paid by the player. The payment of charge in the present invention may be not only in the form of money such as a coin, but also in the form of any other suitable payment such as electronic money, prepaid card, post pay card, or credit card. If the game machines are connected to the network, the payment is preferably in the form of electronic money or the like.

The writing processing section 23 performs processing for writing character information into the portable information storage device 54 when a charge is paid. In such a case, character information selected from a plurality of items of character information at random or at random under a given condition will be written into the portable information storage device 54. The character information may be of various types of information (e.g., name, image, sound, level, physical strength, offensive power, defensive power, magical power, ability, special ability, using parts, weapons, technique, special technique, skill, speed, maximum speed, acceleration power and so on) relating to each of various characters (e.g., monsters, robots, creatures, fighters, athletes, motorcars, tanks, airplanes, space ships and so on) coming on a game. The character information may be written into the portable information storage device 54 by using radio wave or infrared rays as described, rather than in a direct manner.

The selection processing section 24 performs processing for selecting character information to be written into the portable information storage device 54 according to information which has been already stored in the portable information storage device 54 (e.g., character information, personal information and so on).

The reading processing section 25 performs processing for reading the character information written into the portable information storage device 54 when a charge is paid. The reading may be performed by using radio wave or infrared rays as described, rather than in a direct manner.

The printing processing section 26 performs processing for printing the character information read out from the portable information storage device 54 on the material for printing 58.

The game computation section 27 performs various game computations such as game mode setting, game proceeding, determination of the position and direction of a moving body such as character, determination of viewpoint and line-of-sight, play of the moving body's motion, arrangement of an object in an object space, hit checking, game result computation and so on, according to operational data from the operating section 30, game program and so on.

The operating section 30 is used by the player to input operational data or to insert a coin (or a charge in a broad sense). The function of the operating section 30 may be realized by hardware such as lever, button, coin slot, hopper, or coin counter.

The storage section 32 provides a working area for the components such as the image generation section 42, the sound generation section 46, the communication section 50, the I/F section 52 and the printer 56. The function may be realized by hardware such as RAM. The storage section 32 includes a character information storage section 34 which stores character information downloaded from the host machine 14 of FIG. 1 or read out from the portable information storage device 54.

The information storage medium (which is a computer-readable storage medium) 40 stores information relating to a program, data or the like. The function thereof maybe realized by any hardware such as optical disk (CD or DVD), magneto-optic disk (MO), magnetic disk, hard disk, magnetic tape, semiconductor memory (ROM) or the like. The processing section 20 performs processing according to the program or data stored in this information storage medium 40.

Part or all of the information stored in the information storage medium 40 is transferred to the storage section 32 when the system is powered on. The information stored in the information storage medium 40 includes at least one of various items of information such as program codes, image information, sound information, information of shapes of display objects, table data, list data, player information, information for instructing processing according to the present invention, and information for executing such instructions.

The image generation section 42 generates and outputs various types of images to the display section 44 according to instructions from the processing section 20. The function thereof may be realized by any hardware such as image generating ASIC, CPU, DSP or the like, by a given program (or image generation program), or by image information.

The sound generation section 46 generates and outputs various types of sounds to the sound output section 48 according to instructions from the processing section 20. The function thereof may be realized by any hardware such as sound generating ASIC, CPU, DSP or the like, by a given program (or sound generation program), or by sound information (waveform data and so on).

The communication section 50 performs various controls for communication with the host machine. The function thereof may be realized by hardware such as communication ASIC, CPU or the like, or by a given program (or communication program).

The information for realizing processing of the present invention may be sent from an information storage medium in the host machine to an information storage medium in a game machine through the network and communication section 50. Use of such information storage media provided in the host machine and game machines is also included within the scope of the present invention.

The I/F section 52 provides an interface for performing the transfer (or exchange) of information between the arcade game machine and the portable information storage device 54 according to instructions from the processing section 20. The function thereof may be realized by a slot for inserting the portable information storage device 54 or a data write/read controller IC controlled by instructions from CPU. If the transfer of information between the arcade game machine and the portable information storage device 54 is carried out by wireless communication such as infra-red rays, the function of the I/F section 52 may be realized by hardware such as semiconductor laser, infra-red sensor or the like.

The printer 56 prints various items of information such as letters or images on the material for printing 58 according to instructions from the processing section 20. The function thereof may be realized by hardware such as printing controller IC, printer head or the like.

FIG. 3A shows an example of an appearance in the game machine of FIG. 2. A player starts a game by inserting a coin into a coin slot 60. The player then manipulates a lever 64 and buttons 64 to perform various operations for the game while seeing a picture projected onto the display section 62. If the player inserts a memory card (or a portable information storage device in a broad sense) 68 into a slot 70, character information selected at random (or at random under a given condition) is written onto the memory card 68. In addition, character information already stored in the memory card 68 may be read out and printed on a card (or a material for printing in a broad sense) 72.

Figure 3B:
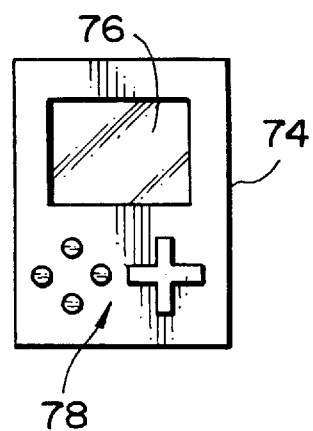
FIGS. 3B and 3C illustrate PDA or infrared communication.
Figure 3C:
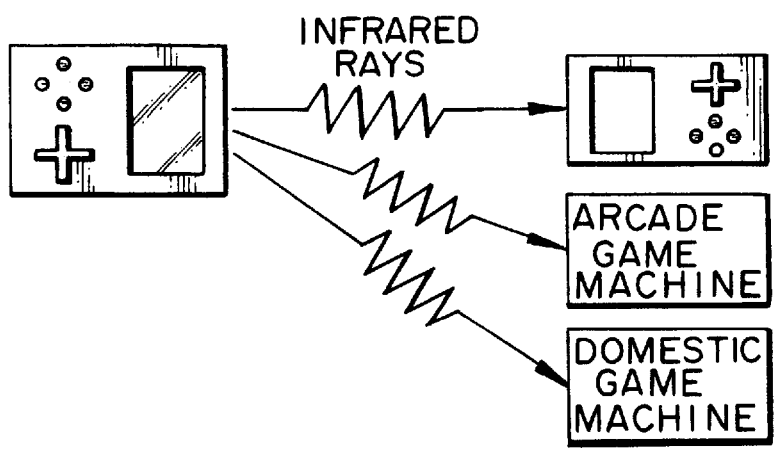

The portable information storage device may be in the form of a personal digital assistant (PDA) or a portable game machine 74 as shown in FIG. 3B, rather than the memory card. This PDA 74 has a display 76 and a control 78 (including buttons and a cross key). The PDA 74 itself may solely be used to enjoy a game play. The PDA may be inserted into a slot in each of the arcade and domestic game machines. Alternatively, the PDA may be used to perform the transfer of information between it and any of the other PDA's, arcade game machines and domestic game machines by wireless communication such as infra-red rays or radio waves, as shown in FIG. 3C.

3. Arrangements of Domestic Game Machine and Host Machine

Figure 4:
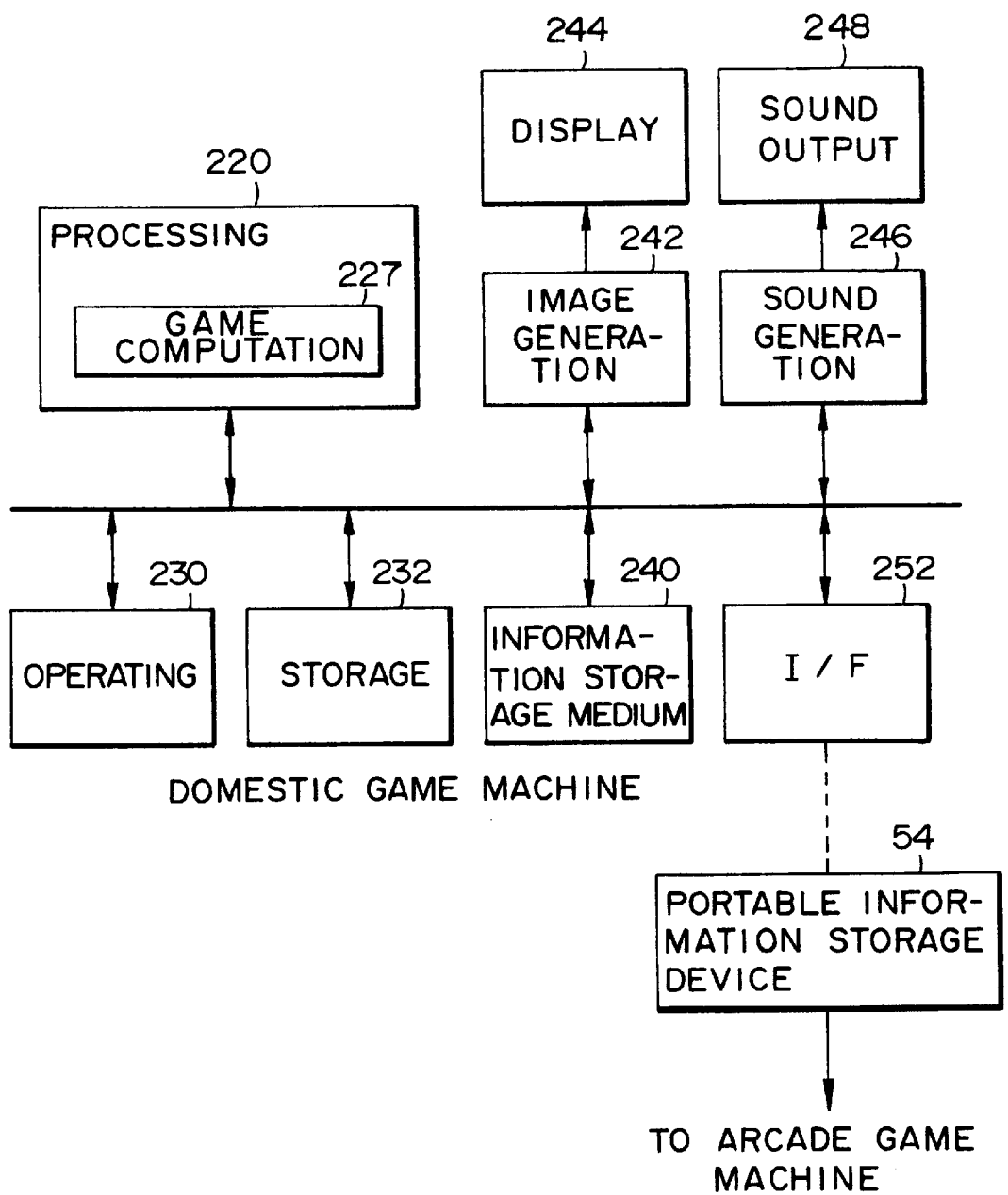
FIG. 4 illustrates an example of a domestic game machine.

FIG. 4 shows an example of the arrangement of a domestic game machine.

As shown in FIG. 4, the domestic game machine comprises a processing section 220, an operating section 230, a storage section 232, an information storage medium 240, an image generation section 242, a display section 244, a sound generation section 246, an sound output section 248 and an interface (I/F) section 52. The processing section 220 includes a game computation section 227 which performs game computations according to operational data from the operating section 230 or a game program or data from the information storage medium 240. The results of the game computations are used to generate images and sounds in a game, which are in turn outputted through the display and sound output sections 244, 248. The player plays a game while viewing the game images and listening to the game sounds. Character information or the like obtained during the game play can be written into the portable information storage device 54 and read out therefrom by any of the arcade game machines shown in FIG. 2. On the contrary, character information obtained by the arcade game machine during the game play can be written into the portable information storage device 54 and read out therefrom through the domestic game machine of FIG. 4.

Figure 5:
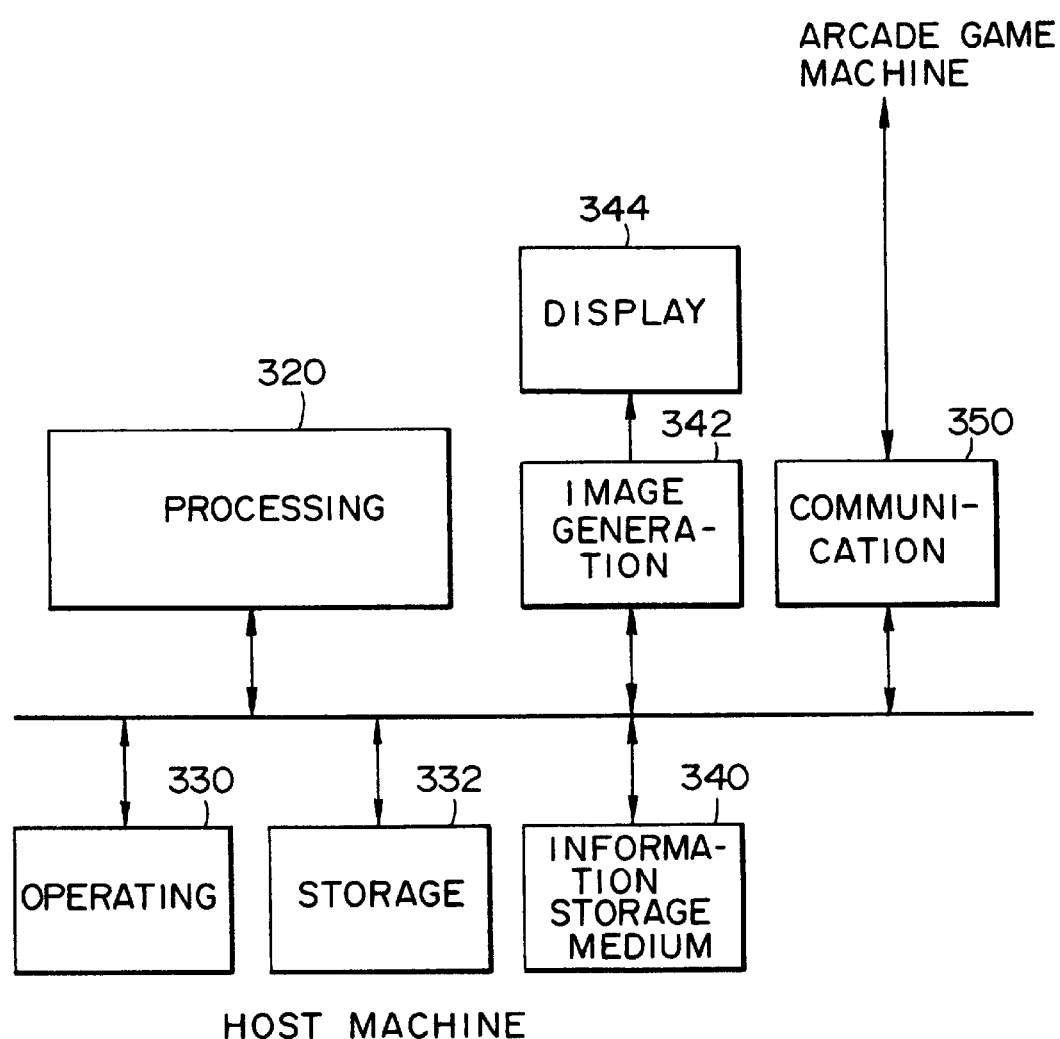
FIG. 5 illustrates an example of a host machine.

FIG. 5 shows an example of the arrangement of a host machine.

As shown in FIG. 5, the host machine comprises a processing section 320, an operating section 330, a storage section 332, an information storage medium 340, an image generation section 342, a display section 344 and a communication section 350. The function of the operating section 330 can be realized by hardware such as a keyboard. An operator manipulates the operating section 33 to perform the network management and so on. Various items of information including character information or management information are mutually transferred between the host machine and the arcade game machines of FIG. 2 through the communication section 350 and network.

Components shown in FIGS. 4 and 5 similar to those of FIG. 2 are designated by similar reference numerals and will not further be described herein since they have substantially the same functions which can be realized by substantially the same hardware structures.

4. Features of this Embodiment

The first feature of this embodiment is that when a player pays a coin (or charge), character information selected at random from a plurality of items of character information (or at random under a given condition) is written into a memory card (or portable information storage device). Thus, the player can enjoy a new game for purchasing and collecting character information, which would never be provided by the conventional game machines.

For example, there is a game program selling system is conceivable in contrast to the game system of this embodiment. However, such a game program selling system must sell a game program selected by a player itself. This is nothing other than conventional vending machines.

On the contrary, the game system of the present invention writes character information selected at random into a memory card. A player cannot know what character information is written into its own memory card until the writing is terminated. Thus, the player waits the termination of information writing while hoping that character information not possessed by the player will be written into the memory card. This provides a fun to game which would never be provided simply by the conventional game program selling systems.

The selection of character information is not required to be completely random, but may be random under a given condition. For example, the character information may be selected at random under such a condition that information of a specified character is selected with a given probability. The character information to be written may be downloaded from the host machine through the network of FIG. 1 or may have previously been stored in the storage section of the game machine.

According to this embodiment, furthermore, the character information is written into a computer-readable memory card. When such a memory card is inserted, for example, into a domestic game machine, the domestic machine can provide a game utilizing the character information in the memory card. More particularly, a domestic game machine can use the purchased character information to provide a fighting game in which a plurality of characters fight against one another, a character education game, and so on. Moreover, players can exchange their character information. Such an exchange of character information can be realized by inserting two memory cards into a domestic game machine or by utilizing such an infra-red communication as shown in FIG. 3C.

In the conventional monster cards, the card makers do not have any means for knowing what monster cards are possessed by the respective players. It is therefore impossible to provide a correlation between the monster cards possessed by the players and the other monster cards included in sets to be sold. Each time when a player purchases a set of monster cards, wasteful monster cards not desired by the player will increase. As a result, there are required many time and money to collect all the types of monster cards.

On the contrary, according to this embodiment, the character information is written into the computer-readable memory card. Therefore, the character information already stored in the memory card can be read out, and the read character information can be considered to select new character information to be written into the memory card.

For example, if character information is selected such that character information not still stored in the memory card will be written into the memory card, it can be avoided that character information already possessed and not desired by the player is written. In an example shown in FIG. 6A, information of characters A, B and C is in a memory card. In such a case, information of other characters D, E, F and so on not still in the memory card will be written into the memory card. Thus, it can be avoided that the information of characters A, B and C is again written into the memory card.

Figure 6A:
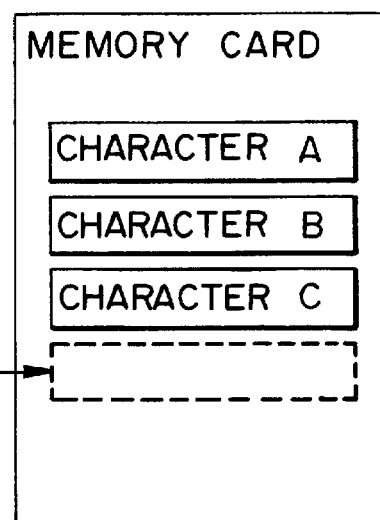
FIGS. 6A to 6C illustrate a technique of writing character information into a memory card.

Alternatively, in the case of FIG. 6A, rather than that only the information of characters D, E, F and so on is written into the memory card, the information of characters A, B and C may also be written into the memory card with a given probability (which is lower than the probability of writing the information of characters D, E, F). If the player is in luck, he or she can acquire character information which are not still collected. This further improves the fun to game due to an additional function of lottery.

Figure 6B:
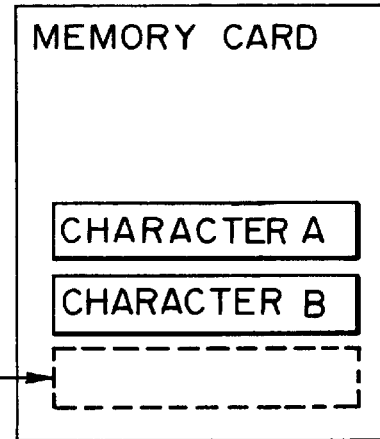

The combination of the characters in the character information already stored in the memory card may be considered to select new character information to be written in the memory card. More particularly, as shown in FIG. 6B, if information of characters A and B has been stored in the memory card, information of character (A+B) obtained from the combination of the characters A and B may be written into the memory card. If the characters A and B are monsters, a composite monster (A+B) is written into the memory card. Thus, the degrees of variety and un-expectation relating to the character information to be written into the memory card will be increased to further improve the fun to game.

Figure 6C:
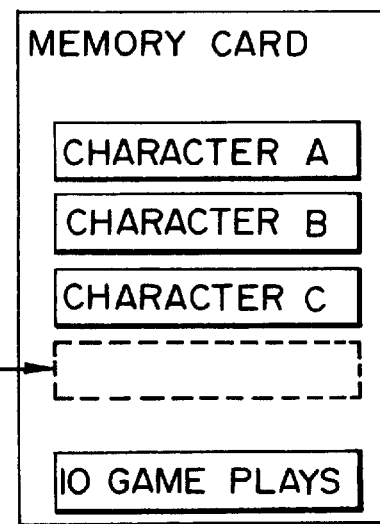

The personal information of the player may be considered to select new character information to be written. The personal information may include a player ID number, a name, the date of player's birth, blood type, password, game ranking, the number of game plays and so on. For example, if the personal information contains the number of game plays (which shows how many times the player played the game with the game machine), a service may be provided to the player depending on the number of game plays. As shown in FIG. 6C, for example, information of a special character which is difficult to get may be written into a memory card of a player who has played the game a lot of times. Alternatively, the selection probability of the character information not still collected may be increased. By thus treating well a player who has played the game a lot of times, players tend to continue the game. This can also increase the operating rate of the game machine.

The game machine of this embodiment can print the character information stored in the memory card 68 and provide a card (or a material for printing in abroad sense) 72 on payment. For example, when a player inserts a coin, the character information in the memory card 68 is read out and printed to provide the card 72.

Figure 7:
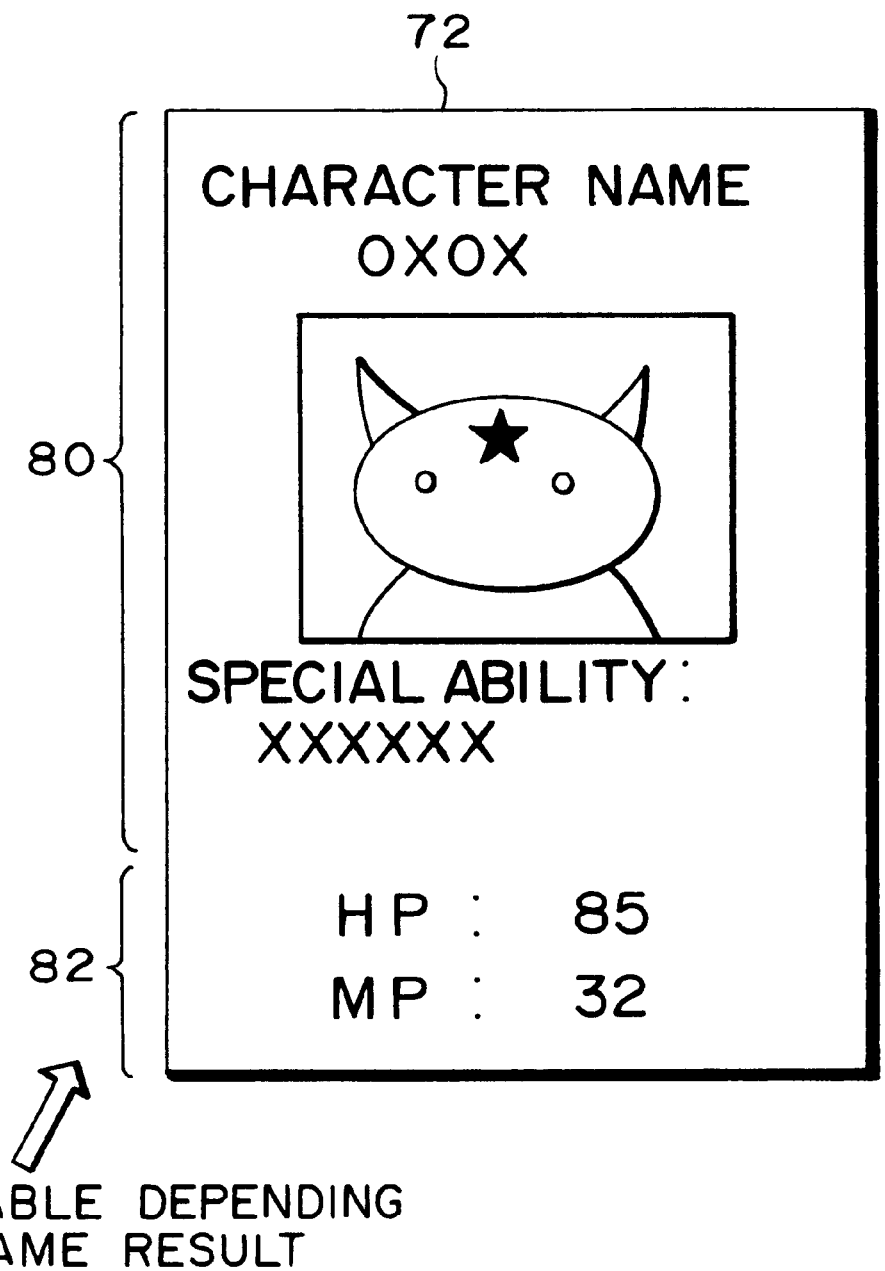
FIG. 7 illustrates a technique of printing character information onto a card.

FIG. 7 shows an example of the printed card 72 on which character information including a character name, image, special ability, HP (hit point), MP (magic point) and so on are printed.

If the card 72 on which the character information is printed is provided on payment, the player can visually enjoy the contents of the collected character information or can enjoy a fighting game using the card 72 together with his or her friends.

Since the character information in the memory card of this embodiment is electronic, the player can play the game only when the character information is written into the domestic game machine. In other words, the game cannot be played without domestic game machines.

On the contrary, when the character information is printed to provide the cards on payment as in this embodiment, players can easily enjoy the game (e.g., card fighting game) using the character information anywhere without any domestic game machine (e.g., on a table).

The player's desire to possess and collect can be satisfied by visually printing the character information possessed by that player to provide a card.

Particularly, when the arcade game machines which can print cards are connected to a network as shown in FIG. 1, a card available only at a specified place and/or time (i.e., a card limited in place and/or time) may be issued. This can further motivate players.

Figure 8A:
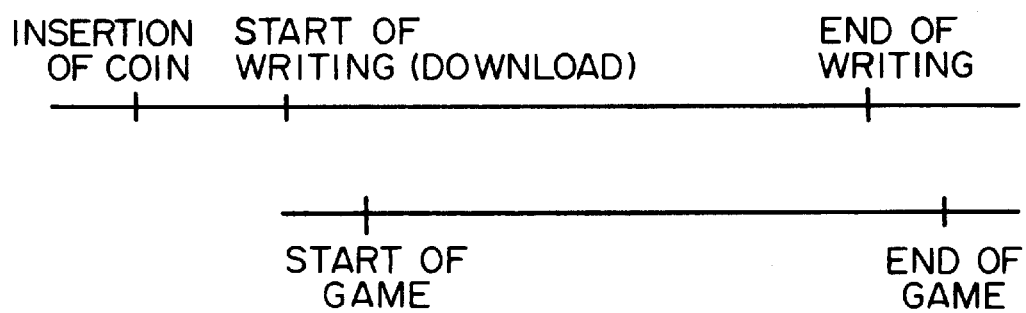
FIGS. 8A and 8B illustrate a technique of causing a player to play an accessory game by making use of writing or printing time.
Figure 8B:
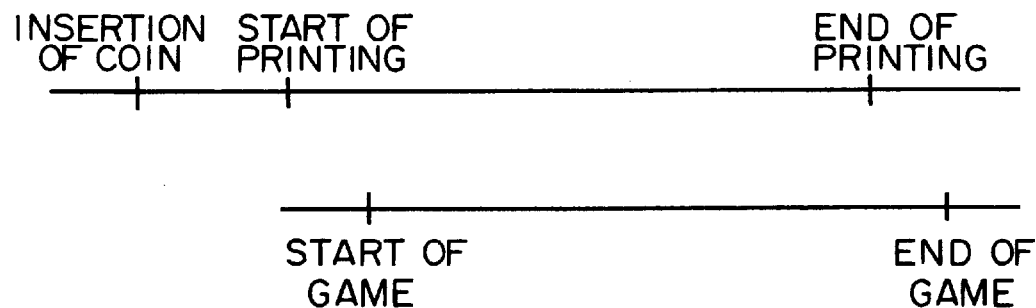

According to this embodiment, as shown in FIG. 8A, the player can play an accessory game (e.g., a character fighting game) during the time when the character information is being written into the memory card or downloaded from the host machine onto the memory card. Alternatively, the player can play the accessory (subordinate) game during the time when the character information is being printed on the card, as shown in FIG. 8B.

The character information writing or printing time is generally long and boring for the player. Particularly, in cases such as when the character information is downloaded from the host machine; when the memory card is a flash memory card requiring its longer writing time; when the character information to be written is too much; and when the character information to be printed is too much, the waiting time for the player becomes further long. Such a prolongation of the waiting time is disincentive for the player.

According to this embodiment, however, the player can enjoy the accessory game during the waiting time for writing, printing or the like. Even if time required to perform the downloading, writing and printing is longer, the player can actually feel as if the waiting time is substantially equal to zero since he or she enjoys the game during the waiting time.

The computation for writing, printing and game may be performed by a single CPU in a multi-task manner. Alternatively, the computation of game may be performed by the CPU while the writing and printing tasks may be carried out by another device.

If the player plays the accessory game during the writing or printing time, the results of that game may be used to vary the character information to be written into the memory card or to be printed on the card. For example, if the results of the game are very superior, special character information having lower probability of appearance may be written into the memory card. Alternatively, the probability that character information not possessed by the player will be written, or the probability that the information of combined characters will be written into the memory card may be increased, as shown in FIGS. 6A and 6B. Thus, the degree of player's enthusiasm for the game can further be increased.

In FIG. 7, the character information which is variable depending on the result of game (HP and MP) may be printed on the second half 82 of the card 72 independent of the first half 80. Thus, the results of game can be used to change the strength of the card, to give variety to the card, or to improve the individuality of the card. As a result, players will tend to continue the game.

5. Processing of this Embodiment

The processing of this embodiment will now be described with reference to flowcharts shown in FIGS. 9, 10, 11A, 11B, 12A and 12B.

Figure 9:
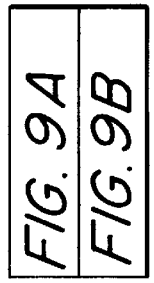
FIG. 9 is a flowchart illustrating an example of a detailed process in this embodiment.
Figure 9A:
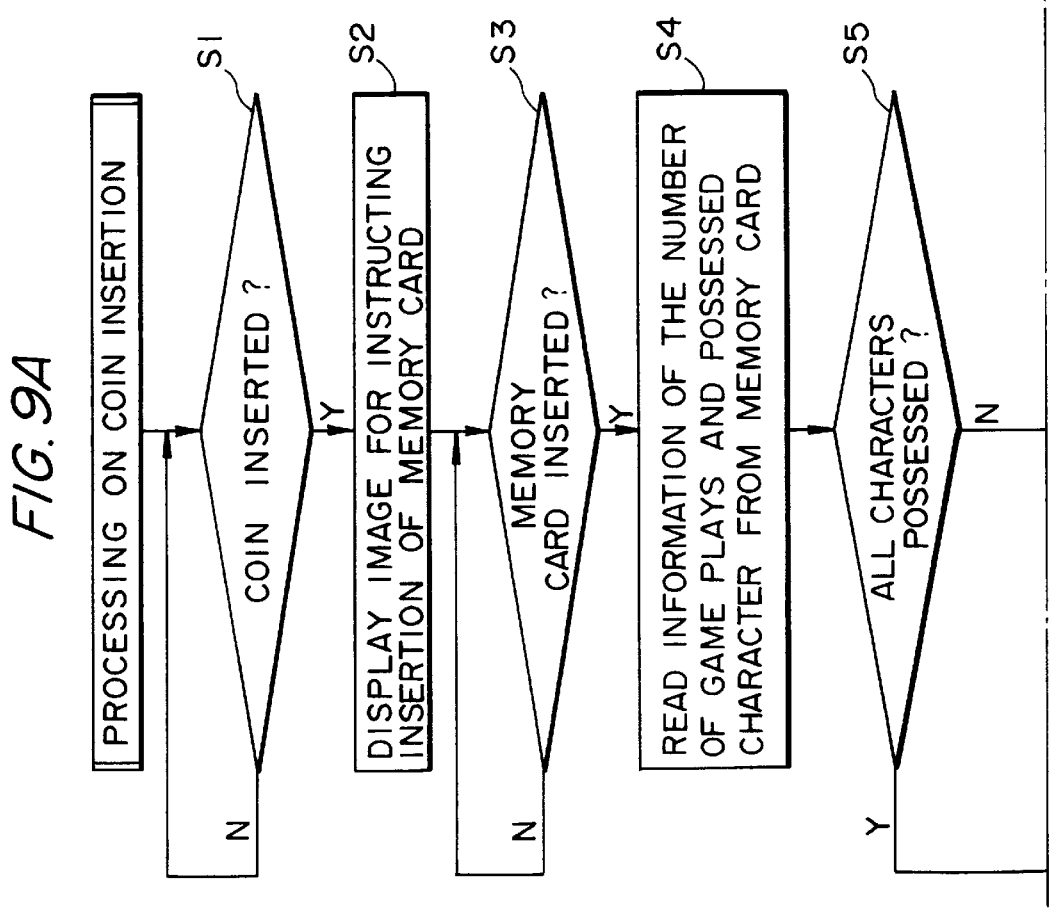
Figure 9B:
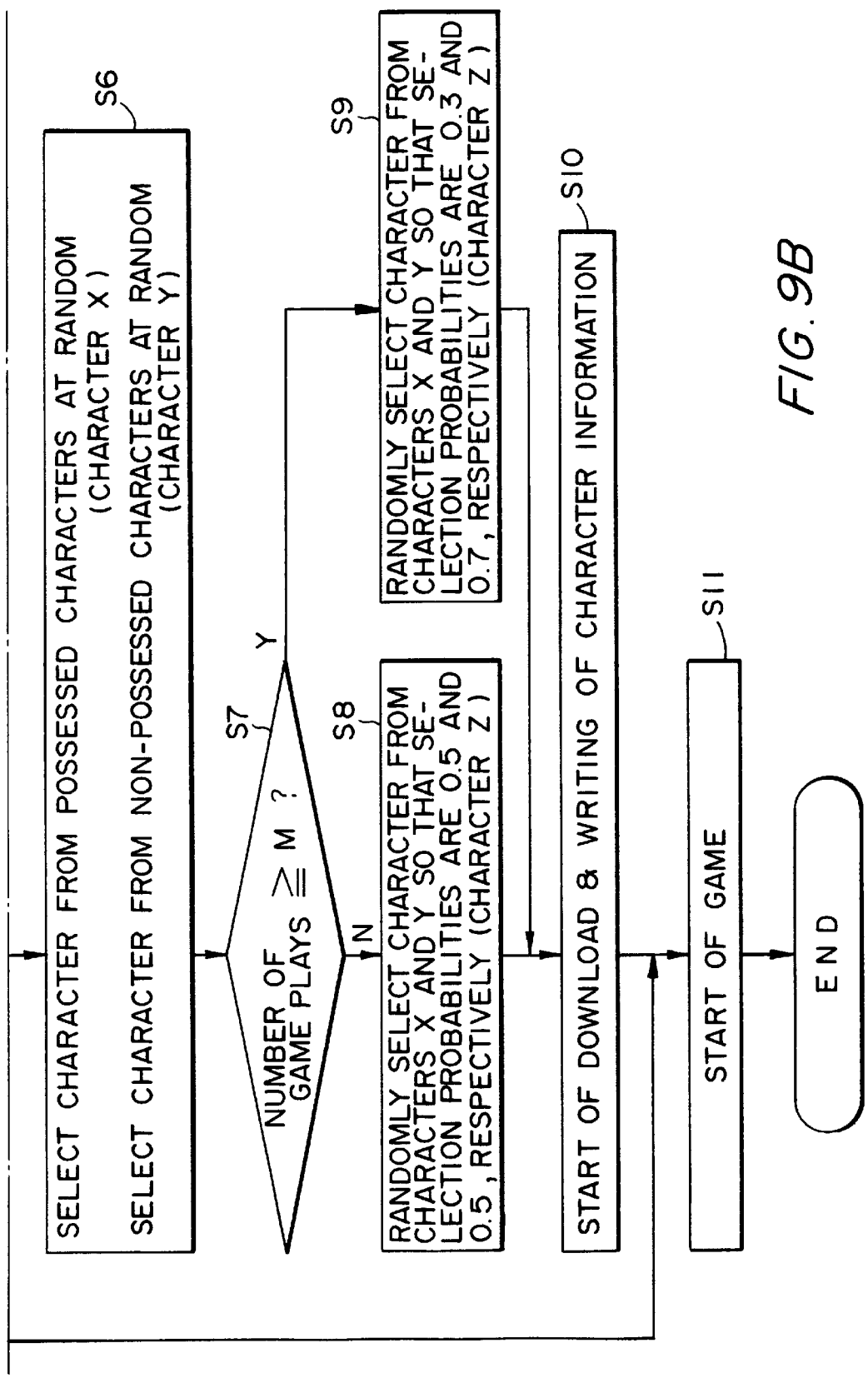

FIGS. 9 and 10 show flowcharts illustrating processing of writing character information into a memory card.

On insertion of a coin in FIG. 9, it is first judged whether or not the coin is actually inserted (step S1). If the coin has been inserted, an image for instructing insertion of a memory card is displayed (step S2). It is then judged whether or not the memory card has been inserted (step S3). If the memory card is inserted, the number of game plays is read out from the memory card with character information possessed by a player (step S4)

It is then judged whether or not all the characters are possessed by the player from the character information read out from the memory card (step S5). If do so, the program proceeds to step S11. On the other hand, if all the characters are not possessed by the player, a character (which will be referred to "a possessed character X") is randomly selected from the characters possessed by the player while another character (which will be referred to "a non-possessed character Y") is randomly selected from characters not possessed by the player (step S6).

It is then judged whether or not the number of game plays by the player is equal to or larger than M from the information of the number of game plays read out from the memory card (step S7). If the number of game plays is smaller than M, a character (which will be referred to "a character Z") is randomly selected such that the probabilities of selection for the possessed character X and non-possessed character Y are equal to 0.5 and 0.5, respectively (step S8). On the other hand, if the number of game plays is equal to or larger than M, the character Z is randomly selected such that the probabilities of selection for the possessed character X and non-possessed character Y are equal to 0.3 and 0.7, respectively (step S9). In other words, the probability in which the non-possessed character Y is selected will be increased if the number of game plays is large (equal to or larger than M). In this way, a player who has played the game a lot of times is treated well.

Next, character information starts to be downloaded and written (step S10). An accessory game (which may be played by the player during the waiting time for download and writing of the character information) is then started (step S11).

FIG. 10 is a flowchart for the download and writing processing of the character information. The download and writing operations will be carried out parallel to the processing of the game started at the step S11 of FIG. 9 (see FIG. 8A).

Character information is downloaded from the host machine (step T1). The downloaded information is then temporarily stored in the character information storage section 34 which is shown in FIG. 2 (step T2). The information of the number of game plays read out at the step S4 of FIG. 9 is then updated (or incremented by one) (step T3). The updated information of the number of game plays is written into the memory card (step T4). Next, the character information stored in the character information storage section 34 (e.g., the information of the character Z at the steps S8 and S9 in FIG. 9) is written into the memory card (step T5).

In such a manner, the writing of the character information into the memory card is completed.

FIGS. 11A, 11B, 12A and 12B show flowcharts relating to a process of printing the character information onto the card.

On insertion of a coin in FIG. 11A, it is judged whether or not the coin has actually been inserted (step U1). If the coin has been inserted, an image for instructing the player to insert the memory card is displayed (step U2). Then it is judged whether or not the memory card is inserted (step U3). If the memory card is inserted, information of possessed character is then read out from the memory card (step U4).

Next, the player selects any desired character information to be printed from the information of possessed character by utilizing a displayed image for a selection or the like (step U5). The printing of the first half 80 of the card 72 in FIG. 7 is started according to the selected character information (step U6). The accessory game (i.e., a game to be played by the player during the printing or waiting time) is started (step U7).

On termination of the accessory game, the processing of game termination in FIG. 11B is carried out. Namely, the values HP and MP are computed from the results of game (step V1). The second half 82 of the card 72 in FIG. 7 begins to be printed (step V2). The player waits until the card is ejected (step V3).

Figure 12A:
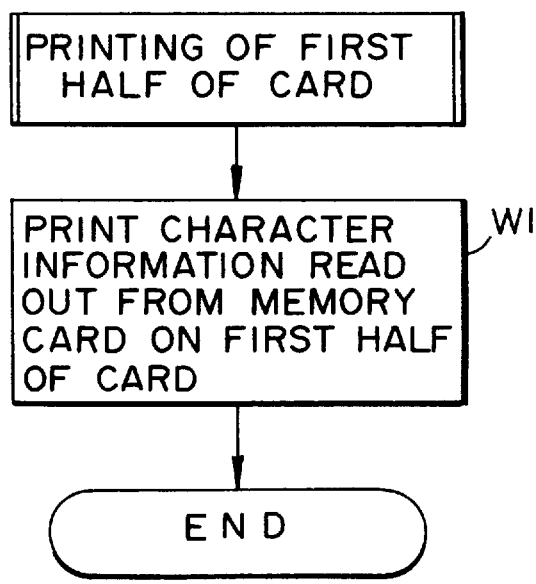
FIGS. 12A and 12B are flowcharts illustrating a further example of a detailed process in this embodiment.

In the process of printing the first half of the card shown in FIG. 12A, the character information read out from the memory card at the step U4 of FIG. 11A and selected by the player at the step U5 is printed on the first half 80 of the card 72, as shown in FIG. 7 (step W1). More particularly, a name, an image, a special ability and so on will be printed on the card in this case.

Figure 12B:
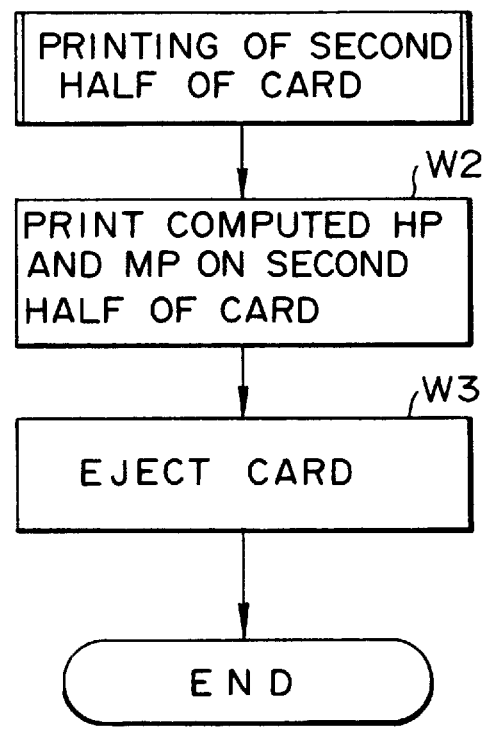

On the other hand, the process of FIG. 12B prints the values HP and MP computed at the step V1 of FIG. 11B on the second half of the card (step W2). The printed card is then ejected (step W3).

In such a manner, the card on which the character information have been printed is issued to the player on payment.

The present invention is not limited to the illustrated embodiment, but may be carried out in any one of various modified or changed forms.

For example, the structures of the game machines according to the present invention are not limited to those of FIG. 2, but may be modified or changed to any other suitable form. The writing and/or printing process of the character information may be shared by the game machine, host machine and servers.

Although FIG. 3A shows both the two processes of writing the character information into the portable information storage device (or memory card) and of printing the character information on the material for printing (or card), only one of these processes may be carried out by the game machines of the present invention.

The methods of writing the character information into the portable information storage device and printing them are not limited to those shown in FIGS. 6A, 6B, 6C and 7.

It is particularly desirable in the present invention that the player can play the accessory (subordinate) game during the writing/printing time, as shown in FIGS. 8A and 8B. However, this is not essential in the present invention.

The arrangement of the present invention in which the information is communicated through the network while at the same time the player can play the accessory game during the writing time is not limited to the game machines shown in FIGS. 2 and 3A, but may similarly be applied to any other suitable game machines. For example, such an arrangement may be applied to a game machine in which a game of collecting items can be played in the following manner:

The player plays a game of collecting items in the domestic game machine. There are a lot of collectable items, including items which are hardly found and items which cannot be found by the domestic game machine.

In the arcade game machines connected to the network, the items collected by the domestic game machine can be used to fight against the other players playing by the other game machines connected to the network or against a computer. In such a case, the fighting can favorably be proceeded for the player if he or she possesses stronger or better items.

During the game play, the information downloaded through the network are written into the portable information storage device. For example, event information represented in the form of letters, new key information for proceeding the game in the domestic game machine and other information may be written into the portable information storage device. During the writing process, the player can play the accessory game and actually feel as if the waiting time is substantially equal to zero.

If the player has won the fighting game, he or she can acquire such an item that could not be acquired by the domestic game machine. Such an item may be one downloaded through the network or one previously stored in the storage device.

As the player inserts the portable information storage device into the domestic game machine after writing processing and starts the item collecting game, he or she can see the event information from the letter information written during the game by the arcade game machines. If a new key information is written by the arcade game machines, a completely new event occurs to provide a new development to the game. Furthermore, the items acquired by the arcade game machines can be used in the game by the domestic game machine.

The arrangement of the present invention in which the information is communicated through the network while at the same time information to be written into the portable information storage device is selected according to the information already stored in the portable information storage device is not also limited to the game machines shown in FIGS. 2 and 3A, but may similarly be applied to any other suitable game machines.

What is claimed is:

1. A game machine including a device for selling character information, the device comprising:

a device for communicating with a portable information storage device;

means for receiving a charge;

writing means for performing processing for writing the character information into a portable information storage device when the charge has been paid, wherein said writing means performs processing for writing at least one item of the character information selected from a plurality of items of the character information at random or at random under a given condition into the portable information storage device; and means for performing a game computation for enabling a player to play a given accessory game during the time when the character information is being written into the portable information storage device.

2. The game machine as defined in claim 1, wherein the writing means selects the character information to be written into the portable information storage device based on information already stored in the portable information storage device.

3. The game machine as defined in claim 2, wherein the writing means selects the character information still not stored in the portable information storage device to be newly written into the portable information storage device.

4. The game machine as defined in claim 2, wherein the writing means selects the character information based on a combination of character information already stored in the portable information storage device.

5. The game machine as defined in claim 2, wherein the writing means selects the character information based on personal information of a player.

6. The game machine as defined in claim 5, wherein the personal information is information of the number of game plays by the player.

7. The game machine as defined in claim 1,
wherein the character information to be written into the portable information storage device is updated depending on the result of the accessory game by the player.

8. The game machine as defined in the claim 1,
wherein the game machine is connected to a network; and
wherein the portable information storage device is mountable into a domestic game machine and information can also be transferred between the portable information storage device and the domestic game machine.

9. A game machine including a device for printing character information, the device comprising:
a device for communicating with a portable information storage device;
means for receiving a charge;
reading means for performing processing for reading out the character information stored in a portable information storage device when the charge has been paid;
means for performing processing for printing the read character information on a material for printing; and
means for performing a game computation for enabling a player to play a given accessory game during the time when the character information is being printed on a material for printing.

10. The game machine as defined in claim 9,
wherein the character information to be printing on a material for printing is updated depending on the result of the accessory game by the player.

11. The game machine as defined in claim 9,
wherein the game machine is connected to a network; and
wherein the portable information storage device can be mounted into a domestic game machine and information can also be transferred between the portable information storage device and the domestic game machine.

12. An arcade game machine placed in an amusement center, comprising:
communication means for communicating information through a network;
means for performing processing for writing information sent through the network into a portable information storage device, wherein the portable information storage device is mountable into a domestic game machine and information is transferable between the portable information storage device and the domestic game machine; and
means for performing a game computation for enabling a player to play a given accessory game during the time when information received through the network is being written into the portable information storage device.

13. A computer-readable information storage medium used in a device for selling character information, comprising:
information for receiving a charge;
information for performing processing for writing the character information into a portable information storage device when the charge has been paid;
information for performing processing for writing at least one item of the character information selected from a plurality of items of the character information at random or at random under a given condition into the portable information storage device; and
information for performing a game computation for enabling a player to play a given accessory game during the time when the character information is being written into the portable information storage device.

14. The information storage medium as defined in claim 13,
wherein the character information to be written into the portable information storage device is selected based on information already stored in the portable information storage device.

15. The information storage medium as defined in claim 14,
wherein the character information still not stored in the portable information storage device is selected to be newly written into the portable information storage device.

16. The information storage medium as defined in claim 14,
wherein the character information is selected based on combination of character information already stored in the portable information storage device.

17. The information storage medium as defined in claim 14,
wherein the character information is selected based on personal information of a player.

18. The information storage medium as defined in claim 17,
wherein the personal information is information of the number of game plays by the player.

19. The information storage medium as defined in claim 13,
wherein the character information to be written into the portable information storage device is updated depending on the result of the game by the player.

20. A computer-readable information storage medium used in a device for printing character information, comprising:
information for receiving a charge;
information for performing processing for reading out the character information stored in a portable information storage device when the charge has been paid;
information for printing the read character information on a material for printing; and
information for performing a game computation for enabling a player to play a given accessory game during the time when the character information is being printed on a material for printing.

21. The information storage medium as defined in claim 20,
wherein the character information to be printed on a material for printing is updated depending on the result of the accessory game by the player.

22. A computer-readable information storage medium comprising a program for realizing:
means for communicating information through a network;
writing means for performing processing for writing information sent through the network into a portable information storage device, wherein the portable information storage device is mountable into a domestic game machine and information can be transferred not only between the portable information storage device and an arcade game machine but also between the portable information storage device and the domestic game machine; and
means for performing a game computation for enabling a player to play a given accessory game during the time when the information received through the network is being written into the portable information storage device.

23. A game machine including a device for selling character information, the device comprising:

a device for communicating with a portable information storage device;

means for receiving a charge; and writing means for performing processing for writing the character information into a portable information storage device when the charge has been paid, wherein said writing means performs processing for writing at least one item of the character information selected from a plurality of items of the character information at random or at random under a given condition into the portable information storage device, selects the character information to be written into the portable information storage device based on information already stored in the portable information storage device; and based on personal information of a player.

24. A computer-readable information storage medium used in a device for selling character information, comprising:

information for receiving a charge;

information for performing processing for writing the character information into a portable information storage device when the charge has been paid; and information for performing processing for writing at least one item of the character information selected from a plurality of items of the character information at random or at random under a given condition into the portable information storage device, wherein the character information to be written into the portable information storage device is selected based on information already stored in the portable information storage device and based on personal information of a player.

25. A game machine including a device for selling character information, the device comprising:

a device which communicates with a portable information storage device which is a computer-readable storage device;

a unit which receives a charge;

a reading unit which performs processing for reading information from the portable information storage device; and a writing unit which performs processing for writing the character information into the portable information storage device when the charge has been paid, wherein the writing unit performs processing for writing at least one item of the character information selected from a plurality of items of the character information at random or at random under a given condition into the portable information storage device; and wherein the reading unit reads information which is already stored in the portable information storage device and the writing unit selects the character information to be written into the portable information storage device based on the information read by the reading unit.

26. The game machine as defined in claim 25, wherein the writing unit selects character information still not stored in the portable information storage device to be newly written into the portable information storage device.

27. The game machine as defined in claim 25, wherein the writing unit selects character information based on combination of character information already stored in the portable information storage device.

28. The game machine as defined in claim 25, wherein the writing unit selects character information still not stored in the portable information storage device with a first probability and selects character information already stored in the portable information storage device with a second probability which is lower than the first probability.

29. A computer-readable information storage medium used in a device for selling character information, comprising:

information for communicating with a portable information storage device which is a computer-readable storage device;

information for receiving a charge;

information for performing processing for reading information from the portable information storage device;

information for performing processing for writing the character information into a portable information storage device when the charge has been paid; and information for performing processing for writing at least one item of the character information selected from a plurality of items of the character information at random or at random under a given condition into the portable information storage device;

wherein information which is already stored in the portable information storage device is read out and the character information to be written into the portable information storage device is selected based on the read out information.

30. The information storage medium as defined in claim 29, wherein character information still not stored in the portable information storage device is selected to be newly written into the portable information storage device.

31. The information storage medium as defined in claim 29, wherein character information is selected based on a combination of character information already stored in the portable information storage device.

32. The information storage medium as defined in claim 29, wherein character information still not stored in the portable information storage device is selected with a first probability and character information already stored in the portable information storage device is selected with a second probability which is lower than the first probability.

* * * * *